Oct. 6, 1925.  
H. S. MILLS  
ROSIN COMPOUND AND PROCESS FOR PRODUCING SAME  
Filed May 23, 1924
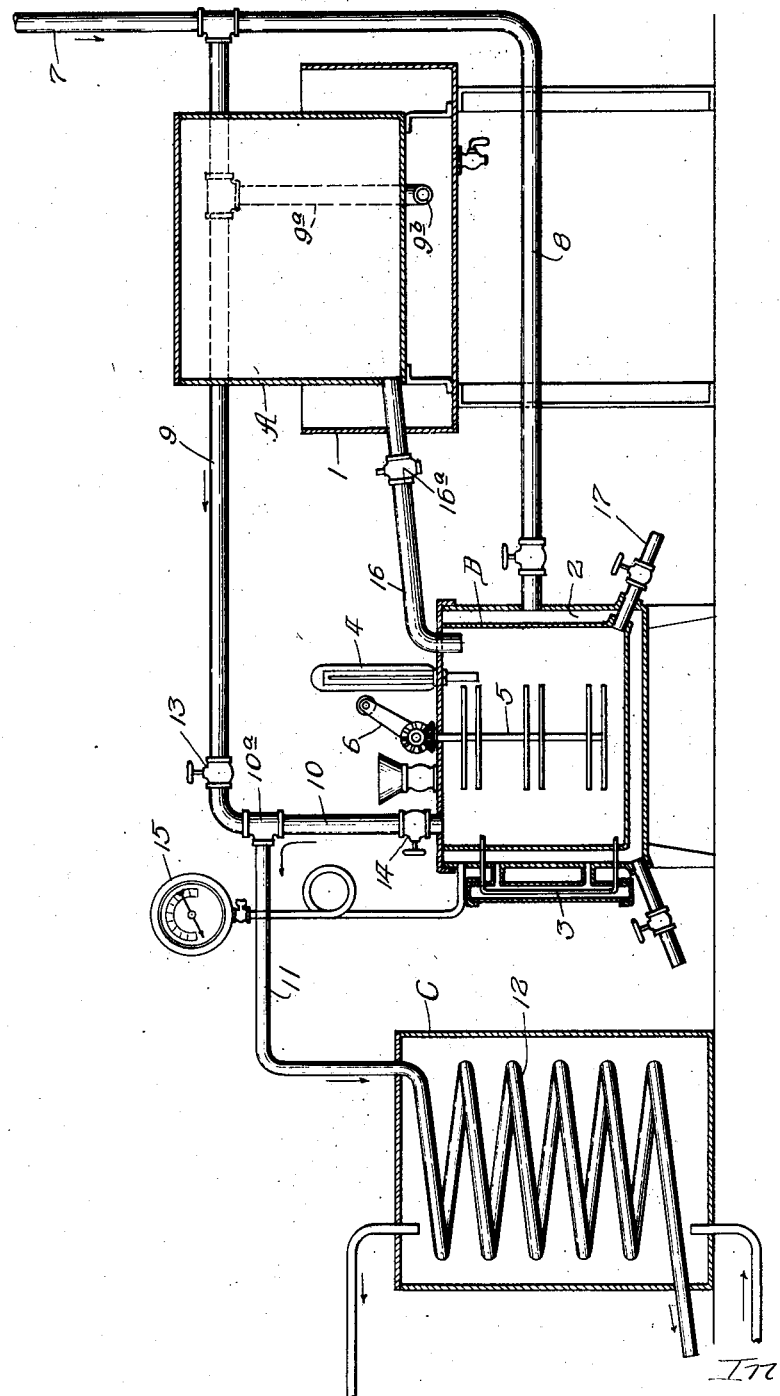
Inventor  
Herbert S. Mills,  
By Dyrenforth, Lee, Chritton & Wiles,  
Attys.

Patented Oct. 6, 1925.

1,556,237

UNITED STATES PATENT OFFICE.

HERBERT S. MILLS, OF OAK PARK, ILLINOIS, ASSIGNOR TO MILLS NOVELTY COMPANY, OF CHICAGO, ILLINOIS, A CORPORATION OF ILLINOIS.

ROSIN COMPOUND AND PROCESS FOR PRODUCING SAME.

Application filed May 23, 1924. Serial No. 715,305.

*To all whom it may concern:*

Be it known that I, HERBERT S. MILLS, a citizen of the United States, residing at Oak Park, in the county of Cook and State of Illinois, have invented a new and useful Improvement in Rosin Compounds and Processes for Producing Same, of which the following is a specification.

This invention relates to the production of a rosin compound which is particularly suited for use in rosining a disk-bow of an electrically played violin. The rosin compound may be employed for other purposes, however.

The primary object is to provide a compound peculiarly suited for the use indicated. A further object is to provide a readily practiced process for producing the compound and improved apparatus adapted for use in connection with such process.

The accompanying drawing illustrates the improved apparatus which may be advantageously employed for practicing the improved process to produce the new compound, the view being a sectional elevation.

The compound may be composed of about seven pounds of rosin and one pound of gum sandarac. These ingredients are blended into a compound of uniform composition by means of the improved process which will be presently described. It is preferred, also, to introduce into the compound a small percentage of raw linseed oil.

A composition which has proven highly satisfactory in use may be prepared by employing six and three-fourths pounds rosin and one pound gum sandarac, with a small percentage of raw linseed oil added, say about one-fourth pint. The proportions may be varied, but it is desirable that the rosin shall constitute at least eighty per cent of the combined weight of the main ingredients, and the best proportions are about six and three-fourths pounds rosin to one pound gum sandarac.

As an example of a suitable method for preparing the compound, the following may be given:

Place in a suitable tank or vessel, which may be heated, six and three-fourths pounds rosin, one pound gum sandarac, and one-half gallon of practically pure alcohol. It is desirable that the alcohol shall have little or no water in it. 97 proof alcohol will serve the purpose. Allow the rosin and gum to dissolve; distill off the alcohol; add one-fourth pint of raw linseed oil; and then agitate or stir the mixture, while in fluid or viscous condition, for a few minutes. The distilling and agitating operations may be carried on in a suitable vessel, separate from the dissolving tank, if desired. The alcohol distilled from the mixture may pass to a condenser and be recovered.

The rosin compound may be drawn from the distilling vessel and introduced into an electric boiler, and there boiled for about twenty-five minutes. The froth or foam may then be burned from the top surface of the rosin compound, and the rosin compound may be poured in the molds and allowed to cool. The purpose of the use of a small percentage of linseed oil is primarily to increase the fluidity of the composition when it is in the heated condition and to enhance the intimate mixture or blending of the rosin and gum sandarac, the purpose being to produce a substantially homogeneous compound.

Referring to the drawing, A represents a dissolving tank; B, a distilling and mixing tank; and C, a condenser.

The dissolving tank A preferably has its lower portion located in a jacket 1; and the distilling tank B is equipped with a jacket 2. The tank B may be equipped with a gauge 3, a thermometer 4, and an agitator 5, operated by the crank 6. The jacket 1 may contain water. Steam may be supplied through a pipe 7, having branches 8 and 9. The branch 8 connects with the jacket 2, and a branch 9ª terminates in a jet 9ᵇ located in the lower portion of the jacket 1. The branch 9 connects with a pipe 10 equipped with a T-fitting 10ª from which a pipe 11 leads to the coil 12 of the condenser C. Branch 9 is equipped with a valve 13, and the pipe 10 is equipped with a valve 14. The pressure gauge 15 is shown connected with the jacket 2.

In the use of the apparatus, rosin, gum sandarac, and alcohol, in proper proportions, are introduced into the tank A, where the solids are brought into solution. This may require about three hours. The solution is then drawn through a pipe 16 into the distiller B. The pipe 16 is fitted with a valve 16ª. The distilling tank is brought to, and maintained at a temperature about 165°

C. The time required for distilling may be about three hours. After the alcohol has been distilled off, and while the rosin compound is still in fluid or viscous condition, a small percentage of raw linseed oil is introduced into the vessel. The agitator is then operated for a period of about five minutes. The mixture is then drawn from the distilling tank through a draw-off pipe 17. The compound is then subjected to a boiling operation for a period of above twenty-five minutes. A foam or froth forms on top, and this may be burned off by applying a flame in any suitable manner. The molten compound may then be poured into the molds and allowed to cool.

The process described results in bringing the rosin and gum sandarac into such an intimate mixture as to produce a substantially homogeneous body; and the compound thus produced is very suitable for use in rosining the rotary bows (usually nested celluloid disks) of an electrically operated violin. The rosin may be put to analogous uses, however.

By means of the pipes and connections shown, steam may be admitted to the condenser coil, when desired, to flush out the coil; and steam may be admitted to the interior of the distilling tank when it is desired to flush out said tank. Steam pressure may be employed also to aid in forcing out the contents of the distilling tank, if desired. Ordinarily, however, it is desirable to avoid the introduction of steam into the interior of the distilling tank prior to the distilling operation or while the distilling operation is in progress. The presence of water in the rosin compound in any appreciable quantity is detrimental to the compound.

The foregoing has been given for clearness of understanding only, and no unnecessary limitations should be understood therefrom, but the appended claims should be construed as broadly as permissible, in view of the prior art.

What I regard as new, and desire to secure by Letters Patent, is:

1. A composition of matter comprising intimately blended rosin and gum sandarac in a volatile solvent, the former comprising more than eighty percent of the combined weight of said ingredients.

2. A composition of matter comprising intimately mixed rosin and gum sandarac in a volatile solvent in proportions of about six and three-fourths pounds rosin and one pound gum sandarac.

3. A composition of matter comprising intimately blended rosin and gum sandarac in a volatile solvent, the rosin constituting more than eighty percent of the combined weights of said ingredients, and a small percentage of raw linseed oil combined with the first-mentioned ingredients.

4. A method of preparing a rosin compound which comprises: dissolving rosin and gum sandarac in a volatile solvent, the rosin constituting at least eighty percent of the mixture of said ingredients; distilling off the solvent; and subjecting the compound to a boiling operation.

5. A method of preparing a rosin compound which comprises: dissolving rosin and gum sandarac in a volatile solvent, the rosin constituting at least eighty percent of the mixture of said ingredients; distilling off the solvent; and subjecting the compound to a boiling operation in the presence of a small percentage of linseed oil.

6. A method of preparing a rosin compound comprising: dissolving rosin and gum sandarac in a volatile solvent, the gum sandarac being less than one-fourth the weight of the rosin; and distilling off the solvent.

7. A method of preparing a rosin compound which comprises: dissolving rosin and gum sandarac in a volatile solvent, the rosin constituting at least eighty percent of the two ingredients; distilling off the solvent; and subjecting the compound while in heated condition to the action of an agitating device.

8. A method of preparing a rosin compound which comprises: dissolving rosin and gum sandarac in a volatile solvent, the rosin constituting at least eighty per cent of the weight of the two ingredients, distilling off the solvent; introducing linseed oil and mixing the rosin compound; and then boiling the mixture.

HERBERT S. MILLS.